United States Patent [19]

Nakajima et al.

[11] 4,235,720
[45] Nov. 25, 1980

[54] UNDERWATER AERATOR

[75] Inventors: Risuke Nakajima, Kamakura; Yoshio Takei, Kadoma; Shoroku Kawauchi, Itami; Tetsuo Fujita, Chigasaki, all of Japan

[73] Assignee: Hanshin Engineering Co., Ltd., Osaka, Japan

[21] Appl. No.: 22,356

[22] Filed: Mar. 20, 1979

[30] Foreign Application Priority Data

Jul. 10, 1978 [JP] Japan .................................. 53/84447

[51] Int. Cl.² ............................................. C02C 1/02
[52] U.S. Cl. ................................ 210/220; 210/242 A
[58] Field of Search ............... 210/15, 63 R, 213, 219, 210/220, 221 R, 221 P, 242 R, 242 A; 261/30, 87, 91, 93, 120

[56] References Cited

U.S. PATENT DOCUMENTS

| 3,123,652 | 3/1964 | Gross | 261/87 |
| 3,521,864 | 7/1970 | Welles | 261/91 |
| 3,573,203 | 3/1971 | Kaelin | 261/120 |
| 3,775,307 | 11/1973 | McWhirter | 210/220 |
| 3,814,396 | 6/1974 | Di Gregorio | 261/87 |
| 3,891,729 | 6/1975 | Ebner | 261/87 |
| 3,920,779 | 11/1975 | Abele | 261/87 |
| 3,923,649 | 12/1975 | Sparham | 210/242 R |
| 3,969,446 | 7/1976 | Franklin | 261/87 |
| 4,045,336 | 8/1977 | Isteri | 210/15 |
| 4,139,579 | 2/1979 | Blum | 261/93 |

FOREIGN PATENT DOCUMENTS

| 193813 | 2/1957 | Fed. Rep. of Germany | 261/87 |
| 2447337 | 4/1976 | Fed. Rep. of Germany | 261/DIG. 75 |
| 2602558 | 7/1977 | Fed. Rep. of Germany | 210/220 |
| 1391201 | 1/1965 | France | 261/91 |

Primary Examiner—Ernest G. Therkorn
Attorney, Agent, or Firm—Wenderoth, Lind & Ponack

[57] ABSTRACT

An aerator comprises an air diffuser rotor for receiving air and forcing out the air through small perforations formed in its peripheral wall, and an agitator-pump unit rotatably disposed immediately above the rotor. When the aerator is installed on the bottom of a waste water purifying tank, the agitator-pump unit raises water from the bottom of the tank and produces a circulating flow of water through the interior of the tank, while the air diffuser rotor forces out air bubbles into the circulating flow, whereby an improved aeration efficiency can be achieved.

2 Claims, 4 Drawing Figures

UNDERWATER AERATOR

BACKGROUND OF THE INVENTION

The present invention relates to underwater aerators for dissolving oxygen into organic waste water with high efficiencies.

With aerators, it is essential to fully dissolve oxygen into waste water in a tank and to circulate the waste water through the interior of the tank.

Aerators of the mechanical type or air diffusion type have heretofore been used for purifying organic waste waters. Mechanical aerators comprise a drive unit adapted to be positioned above the level of waste water in a purifying tank and an agitator coupled to the drive unit for agitating the waste water at an upper portion of the tank to cause the water to contact air over an increased area by scattering drops of water, thus permitting an increased amount of oxygen to dissolve into the water for aeration. Since the aerator is adapted only for this mode of operation, it is unable to circulate the waste water through the purifying tank, almost failing to aerate the water near the bottom and corners of the tank. Accordingly the purifying tank, if useful, must have a small depth but a large open area, which imposes serious limitations on the installation of the apparatus. Additionally the drive unit disposed above the water level produces a noise and disturbs the environment. In a very cold climate or during winter, the surface of the waste water will freeze. The aerator is then unusable unless the ice is broken, and spattered drops of water will freeze as on the drive unit, rendering the apparatus inoperable for subsequent treatment.

With aerators of the air diffusion type, air is merely supplied to an air diffuser tube provided on the bottom of a waste water purifying tank and therefore will not give off a disturbing noise. However the operation in which the waste water must be agitated and circulated with the air forced out from the diffuser tube requires an air supply unit of large capacity for discharging air at very high pressure. Moreover there is the need to use a purifying tank of large open area to cause the waste water to contact air over an increased area. The aerator nevertheless is unable to fully agitate the waste water despite the use of such large air supply unit and purifying tank; with an insufficient amount of oxygen dissolved into the waste water, the aeration efficiency achieved is low. The aerator has another drawback in that while it is out of operation, suspended solids in the water frequently clog up the air diffuser tube, and extreme difficulties are encountered in remedying this problem and maintaining the apparatus in a proper condition.

SUMMARY OF THE INVENTION

The main object of the present invention is to provide an aerator which includes an air diffuser operable in a manner to be free of clogging and in which the air bubbles sent out from the diffuser can be further divided to permit waste water to contact air over an increased area and can also be made to circulate along with the waste water so as to contact the water for an increased period of time. The aerator is adapted for installation on the bottom of a waste water purifying tank and thereby rendered operable free of noise or even when the waste water is covered with a frozen surface.

Another object of the invention is to provide an aerator of the type described above which can be readily submerged or raised from the bottom of the purifying tank by a float attached to the aerator.

DESCRIPTION OF THE PREFERRED EMBODIMENTS

The underwater aerator of this invention comprises a drive unit A, an agitator-pump unit B coupled to the drive unit A, an air diffuser unit C disposed under the agitator-pump unit B and coupled to the drive unit A, water guide ducts D provided above the agitator-pump unit B in communication therewith and an air supply unit F for supplying air to the air diffuser C.

Figure 1:
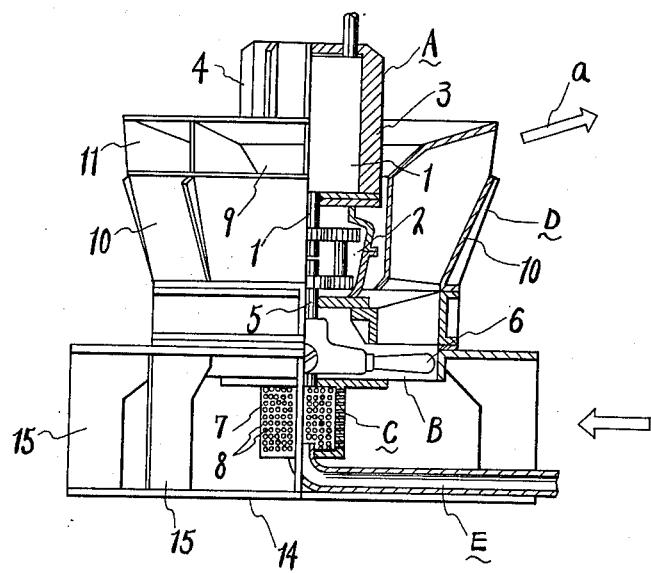
FIG. 1 is a front view, partly in section on the right-hand side, showing an underwater aerator embodying the present invention.
Figure 2:
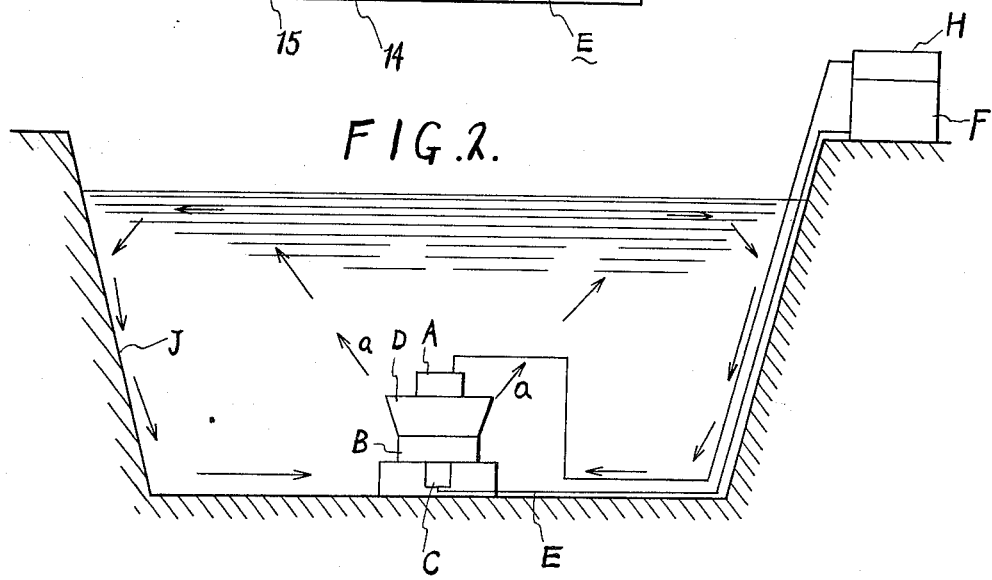
FIG. 2 is a side elevation in section showing a waste water purifying tank with the aerator installed therein.

FIG. 1 shows an embodiment in which the air supply unit F is disposed outside a waste water purifying tank J. The drive unit A comprises a prime mover 1, such as a motor, water-tightly housed in a case 3 provided with heat dissipating fins 4 on its outer periphery or with a water conduit (not shown) incorporated therein. The prime mover 1 has an output shaft 1' coupled to a reduction mechanism 2. The prime mover 1 is electrically connected to a power supply and control unit H disposed at a specified location outside the purifying tank J.

The agitator-pump unit B comprises a propeller 6 mounted on the output shaft 5 of the reduction mechanism 2.

The air diffuser C comprises an air diffuser rotor 7 resembling a cylindrical box and connected at its center top portion to the output shaft 5. The diffuser rotor 7 has a peripheral wall formed with a large number of small perforations 8 and is loosely connected at its bottom center portion to one end of an air supply conduit E.

Each of the water guide ducts D comprises an inner plate 9 positioned closer to the case 3, an outer plate 10 spaced apart from the case 3 and side plates 11 each interconnecting the opposed ends of the plates 9 and 10 on opposite sides. Both the plates 9 and 10 are upwardly and outwardly inclined. The water guide ducts are interconnected into an annular arrangement surrounding the case 3 concentrically therewith.

The air supply conduit E is a flexible tube and keeps the air diffuser C in communication with the air supply unit F comprising an air compressor and a valve.

The underwater aerator of the above structure is intended for the purification of household waste water and industrial waste water to be discharged into the sea, a river, a pond, a swamp or a sewer. The aerator is supported on a base 14 of concrete, metal or like suitable material by vertical legs 15 spaced apart to provide a space for permitting the flow of waste water, whereby the aerator is prevented from coming out of balance and falling when placed in a pond or the like in order to fulfil the contemplated object.

The underwater aerator described above will operate in the following manner.

The power supply and control unit H is operated first to start the prime mover 1, which in turn rotates the propeller 6 to raise the waste water from the bottom of the purifying tank J into the water guide ducts D. The water introduced into the ducts D is run off in a slightly upward direction as indicated by an arrow a.

The air supply unit F is subsequently actuated to introduce air into the air diffuser rotor 7 by way of the air supply conduit E. After filling the interior space of the rotor 7, the air is injected into the purifying tank J via the small air perforations 8.

Since the rotor 7 continues to rotate at all times, the air is forced out from the perforations 8 in the form of minute bubbles. The propeller 6 of the agitator-pump unit B functions to introduce the bubbles into the water guide ducts D along with the waste water while dividing them into still smaller bubbles. The air bubbles discharged from the water guide ducts D in the direction of the arrow a remain in contact with the water for a prolonged period of time to permit oxygen to dissolve into the water while circulating and thereafter escape into the atmosphere from the surface of the water. Some minute air bubbles will not rise to the surface, but will flow with the water along the corner and bottom of the tank J and are drawn into the aerator by the propeller 6, thus allowing oxygen to dissolve into the water also at the corner and bottom portions of the tank J. In this way, the waste water in the purifying tank J can be aerated effectively. However the propeller, which is driven at a relatively low speed, will not break down sludge and like solids. At portions other than the path of circulation of the water, the waste water is stirred by the rise of air bubbles and the secondary flow of water produced by the circulating flow.

Figure 3:
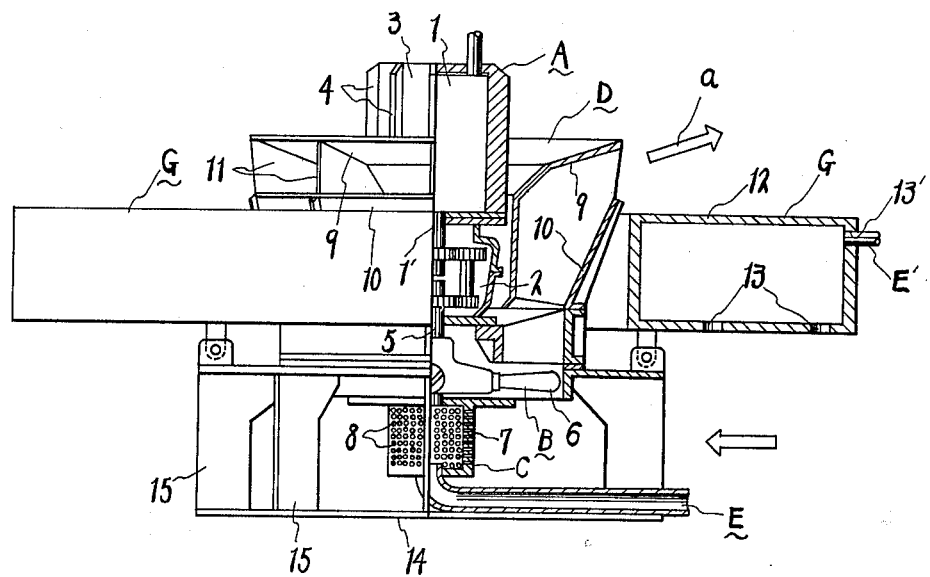
FIG. 3 is a front view, partly in section on the right-hand side, showing the aerator equipped with a float.

FIG. 3 shows another embodiment which comprises the aerator of FIG. 1 and an annular raising and submerging unit G provided around the aerator. The raising and submerging unit G comprises an annular box-shaped float 12 provided around the water guide ducts D and having an air port 13' formed in its outer wall and water ports 13 formed in its bottom wall. The air port 13' is adapted for communication with the atmosphere and the air supply unit F by a flexible air conduit E' and a valve.

When the valve is operated to fill the interior of the float 12 with air by way of the air conduit E' and air port 13', thereby forcing out water from the float 12 into the tank J via the water ports 13, the increased buoyancy given to the float 12 raises the aerator.

Further, when the valve is operated to bring the interior of the float 12 into communication with the atmosphere through the air port 13' and air conduit E', the air in the float 12 is run off into the atmosphere by the water pressure, permitting water to fill up the interior of the float 12 via the water ports 13 and reducing the buoyancy of the float 12. The aerator therefore sinks.

Figure 4:
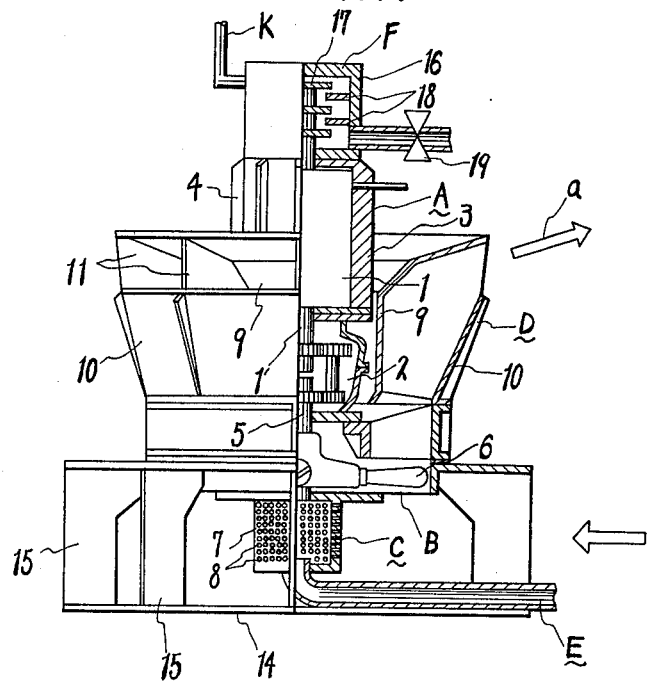
FIG. 4 is a front view, partly in section on the right-hand side, showing the aerator equipped with an air supply unit.

FIG. 4 shows another embodiment in which the air supply unit F is attached directly to the aerator main body immediately above the drive unit A. Stated more specifically, fixedly mounted on the top of the drive unit A is a casing 16 into which the output shaft 1' of the prime mover 1 extends. Vanes 17 arranged at specified spacing are attached to the output shaft 1', while stationary vanes 18 are attached to the inner wall of the casing 16 so as to be interposed between the vanes 17.

The casing 16 is in communication with an air intake pipe K open to the atmosphere and with the air supply conduit E communicating with the air diffuser rotor 7. The remote end of the air intake pipe K is positioned above the level of waste water. The air drawn in through the air intake pipe K is fed to the air supply conduit E to introduce a sufficient amount of air into the diffuser rotor 7 against the water pressure. As shown in FIG. 4, the air supply conduit E is provided with a check valve 19 which prevents the flow of water into the air supply unit F while the unit F is held out of operation.

A turboblower, volume-type blower or the like is of course usable in place of the turbine-type air supply unit described.

When the prime mover 1 of this embodiment is energized by operating the power supply and control unit H, the prime mover rotates the propeller 6 to introduce the waste water into the water guide ducts D and, at the same time, drives the air supply unit F to supply air into the diffuser rotor 7.

The underwater aerator of this invention described above achieves an oxygen dissolving efficiency of 3 kg/KW vs. 2 kg/KW attained by a mechanical aerator and an air supply of 35 to 45% in comparison with 5 to 7% afforded by an aerator of the air diffusion type, hence outstanding results.

Typical examples are given below.

EXAMPLE 1

Waste water resulting from the processing of various marine products at a rate of 400 m$^3$/day was led into a purifying tank, 19.5 m in diameter and 1.0 m in depth, equipped with an aerator of this invention with an air supply rate of 18 Nm$^3$ (18 m$^3$ at 0° C., 1 atm) per minute. The aerator was operated for 20 hours, and the water was thereafter run off for 4 hours. The treatment was carried out at an atmospheric temperature of $-10°$ C. to $-15°$ C. and a water temperature of 2° C. with MLSS (activated sludge in suspension) within the tank at 3,000 ppm.

The waste water was purified with a reduction in B.O.D. (biochemical oxygen demand) of 3,000 ppm to 70 ppm. The treatment raised the water temperature to 10° C. and resulted in D.O. (dissolved oxygen) concentration of 2.5 ppm, with a power consumption of 53 KW/hr.

For the same treatment, a mechanical aerator required the use of a purifying tank having a reduced depth and an open area of at least 750 m$^2$ and entailed a power consumption of 65 KW/hr. Owing to the low atmospheric temperature, the aerator iced up and was difficult to operate smoothly.

An aerator of the air diffusion type was used with the same purifying tank as used for the mechanical aerator, necessitating a power consumption of 110 KW/hr, and hence was extremely uneconomical.

EXAMPLE 2

Waste water from an ion exchange unit for sugar refining was collected at a rate of 2,000 m$^3$/day in a purifying tank, 65 m $\times$ 95 m $\times$ 4.1 m (depth), equipped with five aerators of this invention with a total air supply rate of 105 Nm$^3$/min. The aerators were continuously operated for 24 hours. The treatment was conducted at an atmospheric temperature of $-25°$ C. when lowest or $-15°$ C. on the average and with a snowfall of 1.5 m and MLSS within the tank at 3,000 ppm.

The treatment produced a reduction in B.O.D. of 1,800 ppm to 40 ppm, raised the water temperature to 10° C., resulted in a D.O. concentration of 3.5 ppm and entailed a power consumption of 250 KW/hr.

Mechanical aerators were not usable because the waste water was frozen over the surface.

The use of aerators of the air diffusion type needed a power consumption of 515 KW/hr and was found economically unjustifiable.

EXAMPLE 3

Waste water containing animal wastes from a swinery was collected at a rate of 30 to 40 m$^3$/day in a purifying tank, 5 m × 10 m × 4 m (depth), equipped with an aerator of this invention with an air supply of 2 Nm$^3$/min. The aerator was continuously operated at an atmospheric temperature of −10° C. with a snowfall of 2 m. MLSS within the tank was 3,760 ppm.

The treatment resulted in a reduction in B.O.D. of 3,600 ppm to 60 ppm and a reduction in SS (suspended solids) concentration of 2,800 ppm to 42 ppm, raised the water temperature to 8.1° C. and required a power consumption of 6 KW/hr.

Mechanical aerators were found difficult to use because of icing due to the low water temperature and low atmospheric temperature.

The use of an aerator of the air diffusion type entailed a power consumption of 11.7 KW/hr and was clogged up. The operation therefore involved extreme difficulties.

The underwater aerator of this invention has the following advantages:

(1) Since the air bubbles produced by the diffuser are further finely divided and thereafter circulated through the interior of the purifying tank as entrained in the flow of water, the waste water can be completely aerated even at the corner and bottom portions of the tank.

(2) The diffuser rotor, which rotates at all times with a relatively lower pressure produced outside the rotor, permits an air supply unit of lower capacity to effect satisfactory air supply and renders the small air perforations free of any clogging.

(3) The aerator, which is installable underwater, can be used for aeration at any time even when the purifying tank is covered with a frozen surface in cold climates.

(4) The underwater aerator, when placed in a bottom portion of a deep purifying tank, holds the circulating water in contact with air bubbles for a prolonged period of time and achieves a greatly improved aeration efficiency. Thus waste waters can be fully aerated even with use of a tank having a small open area when the space available is limited as in urban areas.

(5) Since the waste water is agitated for circulation at all times by the apparatus in the water, the dissipation of heat taking place over the surface of the water is less than otherwise. With heat of oxidation biologically produced, the water in the tank can be maintained at a higher temperature against freezing.

(6) When equipped with the raising and submerging unit described, the aerator will spontaneously sink and settle on the bottom of the tank under gravity, whereas the submerged apparatus can be easily raised by supplying air to the float. The aerator is therefore extremely easy to install, raise or shift.

(7) When the air supply unit is mounted directly on the drive unit, the air supply conduit needed can be materially shortened.

What we claim is:

1. An underwater aerator comprising:
   a base adapted to be located at the bottom of a waste water purification tank;
   a plurality of water guide ducts mounted above said base and arranged in the form of an annular assembly arranged concentrically about a vertically extending axis and defining a central chamber, each said water guide duct having a lower inlet opening and an upper outlet opening, said outlet openings of all of said water guide ducts being arranged upwardly and radially outwardly of said lower inlet openings, with respect to said axis;
   a driving unit having extending downwardly therefrom and into said central chamber a rotatable outlet shaft, said outlet shaft being aligned concentrically with said axis;
   a cylindrical air diffuser rotor mounted on an extension of said outlet shaft for rotation therewith, said rotor being arranged at a position below said lower inlet openings of said water guide ducts and concentrically of said axis, said rotor having a cylindrical peripheral wall with a plurality of small perforations therein;
   air supply conduit means, extending through a bottom wall of said rotor, for supplying air into the interior of said rotor and for, upon rotation of said rotor by said driving unit, causing air bubbles to exit from said rotor through said plurality of small perforations and to rise upwardly toward said lower inlet openings of said water guide ducts; and
   propeller means, mounted on said extension of said outlet shaft and rotatable therewith at a speed sufficiently low to avoid breaking up of sludge and solids within the waste water, said propeller means being arranged at a position above said rotor and immediately below said lower inlet openings of said water guide ducts and concentrically of said axis, for finely dividing said air bubbles rising upwardly from said rotor and for imparting a continuous recirculation of waste water, entraining therein the thus finely divided air bubbles, throughout the waste water purification tank in paths vertically upwardly and radially outwardly through said water guide ducts.

2. An underwater aerator as claimed in claim 1, further comprising an air supply unit for supplying air to said air supply conduit means, and float means mounted concentrically about said annular assembly of water guide ducts for selectively floating the underwater aerator or sinking it to the bottom of the tank, said float means having at an upper portion thereof conduit means connected to said air supply unit for supplying air into said float means to thereby float the underwater aerator, and said float means having in a bottom portion thereof water port means for allowing waste water to enter and fill said float means to thereby sink the underwater aerator.

* * * * *